United States Patent [19]

Carbrey

[11] Patent Number: 4,656,661
[45] Date of Patent: Apr. 7, 1987

[54] SWITCHED CAPACITOR COUPLED LINE RECEIVER CIRCUIT

[75] Inventor: Robert L. Carbrey, Boulder, Colo.

[73] Assignees: American Telephone and Telegraph Company, New York, N.Y.; AT&T Information Systems Inc., Morristown, N.J.

[21] Appl. No.: 681,484

[22] Filed: Dec. 13, 1984

[51] Int. Cl.⁴ .................................... H04B 3/36
[52] U.S. Cl. .................... 379/399; 307/261; 307/352; 328/146; 328/151
[58] Field of Search ...... 179/16 AA, 170 NC, 170 R, 179/170 G, 18 AG, 18 AH, 18 FA, 18 FG, 18 FH, 78 R, 78 A, 79, 80; 328/146, 151; 307/261, 352, 353; 358/147, 158; 320/1

[56] References Cited

U.S. PATENT DOCUMENTS

| | | | |
|---|---|---|---|
| 3,819,953 | 6/1974 | Puckette et al. | 307/353 X |
| 3,919,699 | 11/1975 | Hideshima | 340/173 CA |
| 4,037,065 | 7/1977 | Nahay | 179/170 NC |
| 4,039,979 | 8/1977 | Carbrey | 333/70 A |
| 4,053,722 | 10/1977 | Nahay | 179/170 NC |
| 4,295,105 | 10/1981 | Bingham | 332/9 R |
| 4,301,501 | 11/1981 | Carter et al. | 363/62 |
| 4,322,697 | 3/1982 | Carbrey | 333/173 |
| 4,358,790 | 11/1982 | Summers | 358/147 |
| 4,415,777 | 11/1983 | Agnew | 179/170 NC |
| 4,546,324 | 10/1985 | Bingham et al. | 330/9 |

FOREIGN PATENT DOCUMENTS 527709  3/1977  Japan ..................... 307/353

Primary Examiner—Gene Z. Rubinson
Assistant Examiner—R. Vaas
Attorney, Agent, or Firm—John A. Caccuro

[57] ABSTRACT

A receiver circuit uses switched capacitor circuits to couple signals received over a communication facility to connected apparatus. During a first time interval a capacitor is connected across each lead of a facility to sample the facility voltages. During a second time interval these capacitors are disconnected from the facility lines and reconnected in series as the input to a voltage regenerator circuit. The regenerator circuit reconstructs the received signals for output to connected apparatus.

8 Claims, 5 Drawing Figures

SWITCHED CAPACITOR COUPLED LINE RECEIVER CIRCUIT

TECHNICAL FIELD

This invention relates to a circuit for interfacing a communication line to a switching system and more particularly to a line receiver or interface circuit using switched capacitor coupling.

BACKGROUND OF THE INVENTION

Telephone switching systems typically use a digital port circuit to connect to the communication line from each digital terminal. Since large switching systems can interface many digital terminals, the cost of these digital port circuits can become an appreciable percentage of the cost of the system. The receiver circuit part of the port circuit includes a bulky bifilar wound line transformer to provide dc isolation and longitudinal suppression. This transformer is expensive compared to the cost of other components of the circuit. Moreover, a transformer does not permit transmission of "DC" signal states thereby limiting the types of digital data signals which can be used. Additionally, the physical size of this transformer affects the number of components which can be placed on a port board, the spacing between boards and hence affects the physical size of the system. What is desired is a port circuit design which is smaller and more cost effective.

SUMMARY OF THE INVENTION

In accordance with the present invention switched capacitor circuits are used to provide the functions previously provided by a transformer in the receiver circuit of prior art port circuits. More particularly, during a first time interval a first capacitor is charged to the voltage difference between one lead of a communication facility and a first reference voltage while a second capacitor is charged to the voltage difference between a second lead of the facility and a second reference voltage. During a predetermined second time interval the two capacitors are disconnected from the prior connection and connected in series in a manner such that common mode signals on the facility are cancelled while differential signals are summed. During this second time interval resulting voltage from the series connection of the capacitors is switched to a voltage regenerator circuit which decodes the voltage into logic signals for output to connected communication apparatus. One feature of this invention is that "DC" signal states may be regenerated for unipolar signals.

BRIEF DESCRIPTION OF THE DRAWING

The detailed description of the invention will be more fully appreciated from the illustrative embodiment shown in the drawing, in which.

DETAILED DESCRIPTION

This application is filed concurrently with my U.S. patent application Ser. No. 681,447, Case 65, filed on Dec. 13, 1984 which is directed to another design of a switch capacitor coupled line receiver.

Figure 1:
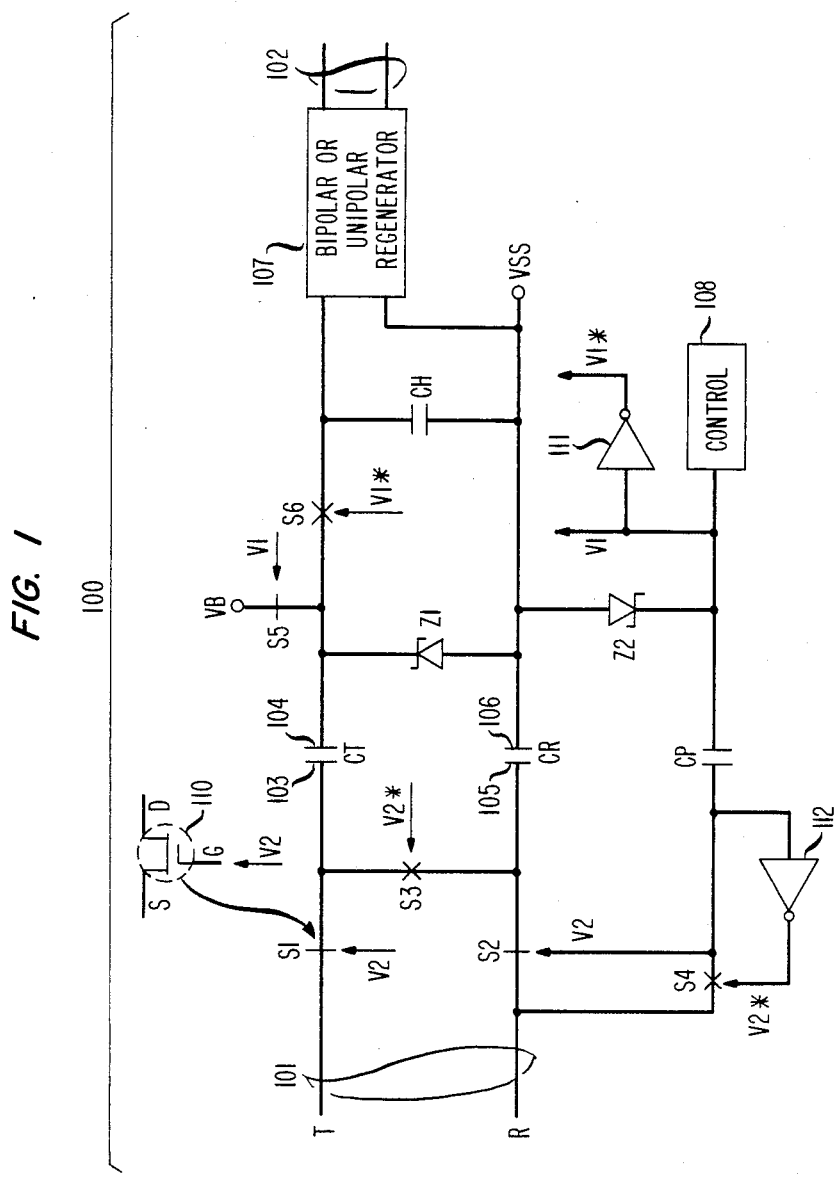
FIG. 1 illustrates a first embodiment of the present invention.

Shown in FIG. 1 is a first embodiment of a receiver circuit (i.e., a port or live circuit) incorporating the present invention 100 for coupling digital signals received over the tip (T) and ring (R) leads of facility 101 to a digital terminal or communication apparatus connected via facility 102.

Figure 2:
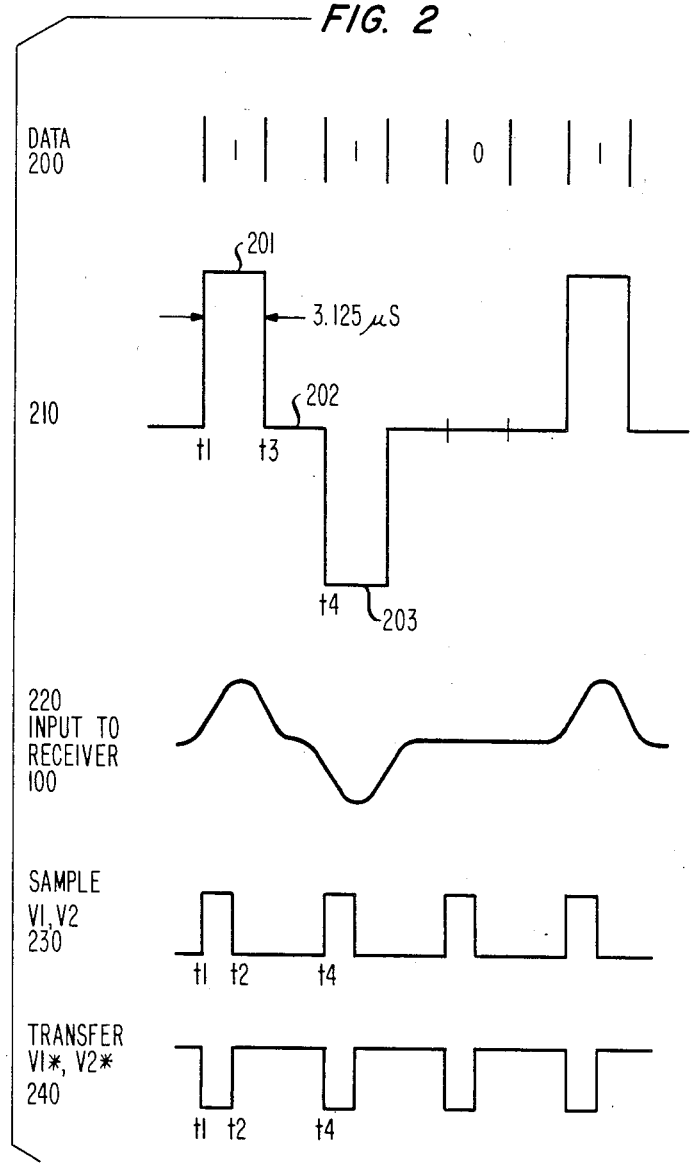
FIG. 2 shows a timing diagram for use in describing the operation of the present invention.

Shown in FIG. 2 is the timing diagram for an illustrative application of the present invention where facility 101 carries bipolar signals at 160 kilobits per second (Kb/s). In bipolar data transmission logical 1 bits are transmitted alternately as positive (e.g., 201) and negative (e.g., 203) 3 volt pulses that are 3.125 microseconds ($\mu$s) wide followed by a 3.125$\mu$s zero volt space (e.g., 202). Thus, a data sequence such as 200 would be transmitted as shown by 210. The logic 1 voltage pulses become attenuated and spread out as the signal travels along facility 101 and appear as pulse stream 220 at the line receiver 100 location. Receiver 100 receives these bipolar pulses and reconstructs the data (200) and the clock signal from the received pulse stream (220). Note, when unipolar data pulses are sent over the facility, each logic 1 pulse can be twice the amplitude (6 volts versus 3 volts) of a bipolar pulse sent over the same facility.

Returning to FIG. 1, there is shown the details of a switched capacitor coupled line circuit according to the present invention for use in a unipolar or bipolar digital signal receiver. Capacitors CT and CR are line coupling capacitors which are switched, respectively, by S1 and S2 to connect to the T and R leads of facility 101. In addition to the T to R lead differential voltages, these capacitors must be able to withstand the high voltages due to lightning induced longitudinals as well as accidental power line crosses. Zener Z1 shunts to voltage supply VSS any charging current through capacitor CT due to a voltage on lead T which exceeds the high impedance voltage range of Z1, thereby protecting switches S5, S6, capacitor CH and regenerator circuit 107. Excessive voltages on the R lead are shunted directly by voltage supply VSS. Zener Z2 shunts to voltage supply VSS any excessive voltage on the R lead, thereby protecting the control circuit 108. These Zener diodes also protect the receiver circuitry from static charge during manufacturing and handling.

Control circuit 108 generates pulsed switch control signals V1, V2 representing the time for sampling the incoming T/R signals and control signals V1*, V2* representing the time interval for transferring the T/R signals to the regenerator circuit 107. Signal V1* is generated by inverting V1 through inverter 111 while V2* is generated from V2 using inverter 112. Signals V2 and V2* are signals V1 and V1* level shifted by the voltage on capacitor CP. Control circuit 108 generates these pulses in a well known manner. Note, when the receiver circuit 100 is used with digital signals, control circuit 108 signals V1 and V1* are phased with the incoming signal, illustratively shown as 220 in FIG. 2. It is a well known characteristic of balanced transmission lines such as 101 that the voltage on the tip side of the line is equal and opposite in polarity to the voltage on the ring lead R. The difference voltage between tip and ring is the transverse voltage VTR≦(VT-VR) comprising the wanted signal. This is represented by waveform 220 of FIG. 2. Longitudinal voltages V2 are, by definition, identical on both the tip and ring leads, T and R. The transverse component of the voltage $-VTR/2$ on the R lead is a mirror image of the component $+VTR/2$ on lead T. When the receiver circuit is used with analogue signals, the signals V1 and V1* occur at a rate exceeding (i.e., 8 $KH_z$) the Nyquist rate of the incoming analogue signal (4 $KH_z$).

The capacitance of capacitors CT and CR are selected to be of equal value and need only be large compared to the holding capacitance of CH (typically a few pico farads) and other stray capacities. The following discussion assumes that capacitors CT and CH are in the parallel or sample state with switches S1, S2, S5 closed and switches S3, S4, S6 open as shown in FIG. 1.

Switches S1–S6 can be implemented using well known N type metal oxide semiconductor (NMOS), P type (PMOS) or complementary (CMOS) type field effect transistors (FETs) or transmission gates as they are sometimes referred to. This type of switch is illustrated by 110 of FIG. 1 and includes source S, drain D, and gate G.

As will be discussed in a later paragraph, switches S1 and S2 operate under control of signal V2 while switches S3 and S4 operate under control of V2*. Switch S5 operates under control of V1 while switch S6 operates under control of V1*. The signals V1, V1*, V2, V2* are applied to the gate terminal G of the associated switch. Pulsed voltage V1 is generated in circuit 108 in response to the clock frequency used for digital transmission (i.e., 128 Kp/s for combined 64 Kb/s speech and 64 Kb/s data signals). Timing frequency and phase position may be recovered from the transmitted signals in a well known manner in response to received T/R line voltage 220 exceeding predetermined voltage thresholds. Or the timing signal may be generated locally with only phase correction required.

Figure 3:
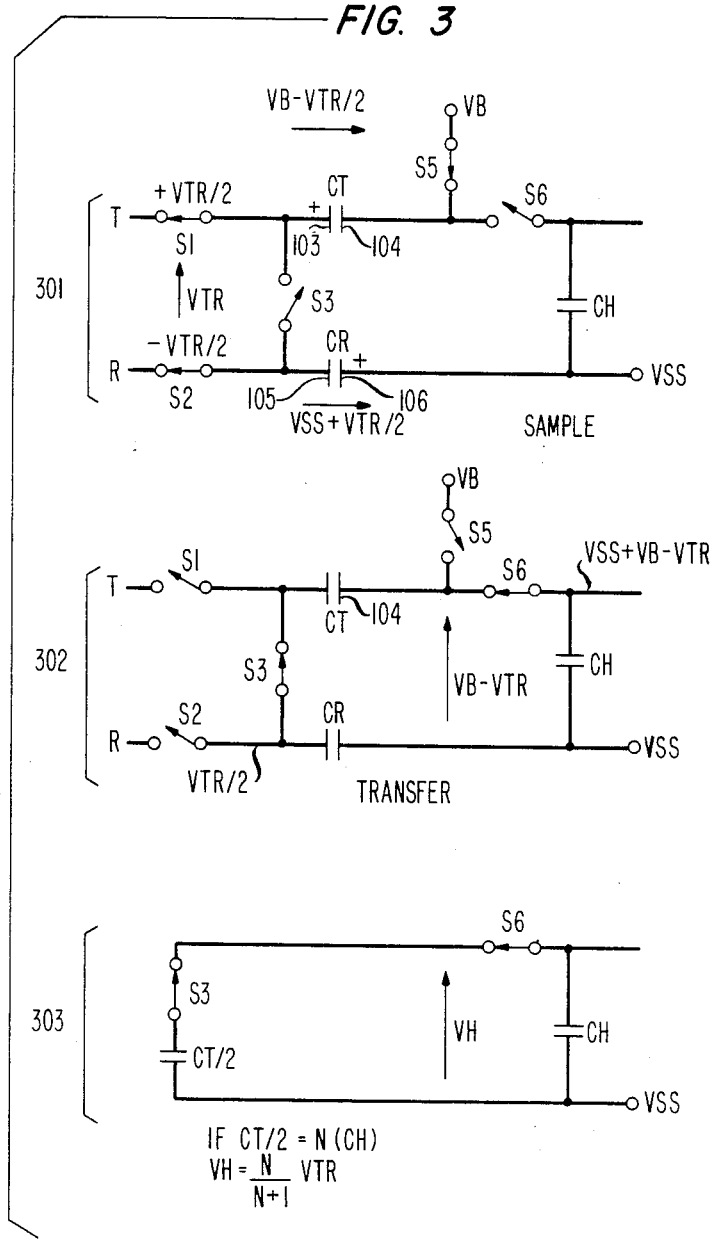
FIG. 3 illustrates equivalent circuits of FIG. 1 useful in describing the operation of the present invention.

With joint reference to FIGS. 1 and 3, during a first time interval (the parallel capacitor connection or sample state 301) capacitor CT is connected between the T lead and the bias voltage VB and capacitor CR is connected between the R lead and the source reference voltage VSS. Capacitor CT charges to the difference between the voltage on the T lead and VB. The bias voltage VB sets the amplitude slicing threshold voltage for unipolar data transmission over facility 101. For unipolar data VB is set at one half the expected received peak voltage while for bipolar data transmission over facility 101, e.g., 220, VB will be set at a zero volt level. Capacitor CR charges to the difference between the R lead voltage and source voltage VSS.

In the sample state, if the differential voltage between the T lead and the R lead is VTR then in the absence of any longitudinal voltage VL, the voltage to which CT charges is $VB-(VTR/2)$ and the voltage to which CR charges is $(-VTR/2)-VSS$. The facility side terminal 103 of capacitor CT is positive with respect to the circuit side terminal 104. Similarly, the facility side terminal 105 of capacitor CR is negative with respect to the circuit side terminal 106.

With reference to FIGS. 1 and 3, during a second time interval (when the sample state is switched to the series capacitor connection of transfer state, 302) switches S1, S2, S5 open and switches S3, S4, S6 close. As noted the pulse switch control voltages V1, V1* and V2, V2* cause the transition from the sample (parallel) state to transfer (series) state. When connected in the transfer state the circuit side terminal 106 of capacitor CR remains connected to VSS. In that instant of time before charge redistribution occurs, the following condition exists. Since switch S3 closes the facility side terminals (103 and 105) of CR and CT are shorted together at voltage $-VTR/2$, corresponding to the voltage at the left plate of CR. As a result, the circuit side terminal 104 of capacitor CT shifts to voltage VB - VTR.

As shown in 303, when capacitors CT and CR have an equal value (CT=CR) the series connection of these results in an equivalent capacitor value CT/2 having the "picked-off" voltage of VTR across it. With capacitor CH in series with equivalent capacitor CT/2 a charge redistribution occurs with the resulting voltage across capacitor CH being determined in the well known manner. If, for example, equivalent capacitor CT/2 equals N times CH (where N is a large integer) then the voltage developed across capacitor CH is $VH = NVTS/(N+1)$. Thus, when N is large almost all of the "picked-off" voltage VTR is transferred to the capacitor CH and coupled to bipolar/unipolar regenerator 107. Note, capacitor CH may be just stray circuit capacity. If capacitor CH is made relatively large for some reason, then it should be discharged between samples to prevent any filtering action. This can be implemented using a switch (e.g., 110) placed across CH and operated in synchronism with switches S1, S2 and S6.

With reference to FIG. 2, switch control voltages V1 and V1*, respectively, represent the sample state (t1–t2) timing and transfer state (t2–t4) timing. Note that for our example of a bipolar received T/R differential voltage, 220, the sample state begins approximately at the beginning of a bit time (i.e., t1) and the capacitors CT and CH charge for about one half of a bit time (e.g., t1 to t2). At approximately the most open part of the received data "eye pattern", when signal 220 is most positive or negative, (e.g., t2) control circuit 108 terminates the sample state causing pulses V1 and V2 to end and pulses V1* and V2* to begin.

When the state of signals V1 and V2 change state switches S1–S6 switch from the sample state to the transfer state. This causes the sampled or picked-off voltage to be coupled from capacitors CT and CR through to capacitor CH. Effectively the sample window is open only for the time required to open switches S1 and S2. This approach is superior to sampling the T/R differential voltage 220 by switching sampling capacitors CT and CR to the line for a short time during the clearest portion (i.e., t2) of the "eye pattern". Such an approach would require a longer sample window time than the presently disclosed method to charge the sampling capacitors to the T/R differential voltage. The longer the sample window time the more noise, crosstalk, etc., to affect the accuracy of the sample.

Figure 4:
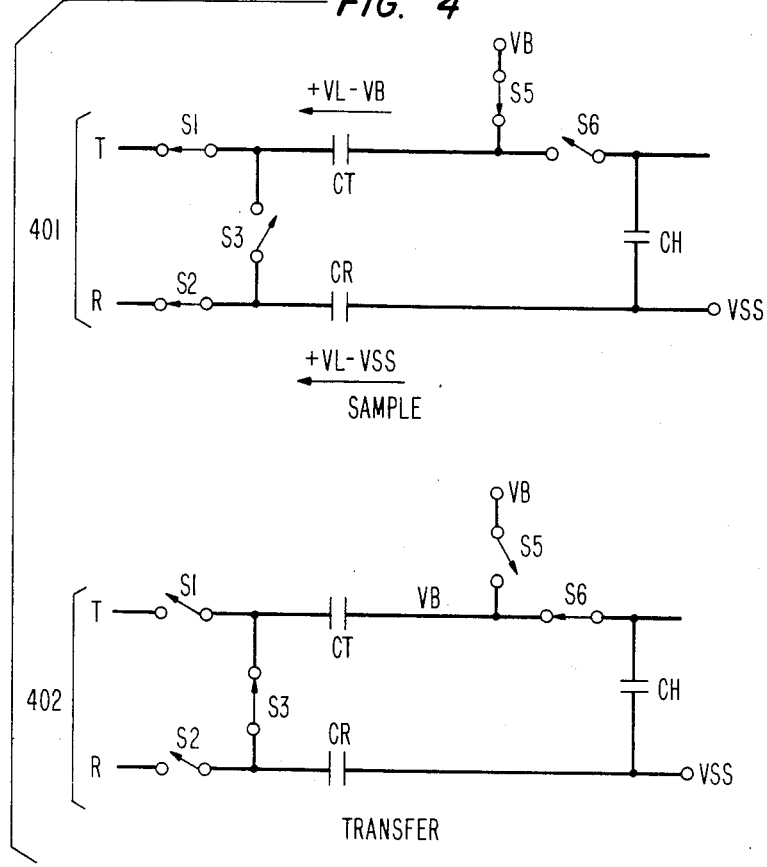
FIG. 4 illustrates the affects of longitudinal voltages on equivalent circuits of FIG. 1.

With reference to FIG. 4, we now assume that longitudinal or common mode signals are present on the T and R leads. The longitudinal signals are rejected by the present line receiver 100 to prevent data errors and to assure satisfactory data transmission. Any longitudinal voltages which are not cancelled in line receiver 100 are converted to a differential voltage and can then only be separated from the data differential voltage by using special filtering techniques. FIG. 4 illustrates the effects of the longitudinal voltages on the operation of the present invention. As shown during the sample state 401, longitudinal or common mode signals VL develop equally on leads T and R and hence on capacitors CT and CR during the sample state. During the transfer state, 402, according to the present invention, the longitudinal voltages on capacitors CR and CT cancel so that the resulting longitudinal voltage across capacitor CH is zero volts.

Returning to FIG. 1, in order to switch the CMOS or NMOS switches S1 and S2 during the presence of longitudinal voltages the gate voltages of S1 and S2 must track the longitudinal voltages on the T and R leads. Since V1 and V1* provide the gate voltages to S1, S2 and S4, V1 and V1* must be dc shifted by the amount of the longitudinal voltage. Capacitor CP provides this voltage shift by being charged to the sum of any longitudinal voltages and the ring side voltage on the R lead during the time when switch S4 is closed. Thus, when pulses V1 and V1* are coupled to the gate leads of switches S1, S2 and S4, the charge on capacitor CP enables these gate lead potentials to track the longitudinal voltage VL and hence be able to appropriately turn-on or turn-off switches S1, S2 and S4.

If we assume the input signal on the T/R lead is a bipolar signal, e.g., 220 of FIG. 2, then the signal or voltage across capacitor CH is coupled to a well known bipolar regenerator 107. This regenerator may be implemented as a pair of monostable or bistable devices, one device which detects positive pulses and one device which detects negative pulses. These devices are appropriately biased to make the decision whether the received data is a logic 0 or logic 1. For the present embodiment an appropriate biased pair of bistable devices such as a D flip-flip (not shown) may be used with the D leads connected to capacitor CH and CLK leads connected to lead V1. One D-type flip-flop is used to detect positive logic 1 signals and the other is used to detect negative logic 1 signals and neither D-type flip-flop being set indicates a logic 0 signal. Note, if a unipolar output is desired for facility 102 a standard bipolar to unipolar converter circuit is used. Similarly, if the input signal on the T/R leads is a unipolar signal then one D-type flip-flop is used as unipolar regenerator 107 in a manner equivalent to that described above.

With reference to FIG. 2, since the voltage across capacitor CH is most fully transferred from capacitors CT and CR at the end of the transfer state, (i.e., at timing t1, t4, etc.) just before capacitors CT and CR are again reconnected in the sample state, (i.e., at the positive edge of V1), it is best that regenerator 107 make the amplitude decision at this time. Hence, in one embodiment, the positive transition, e.g., t4, of the V1 pulse may be used to clock the D-type flip-flop(s) used in regenerator 107. By using an edge triggered device such as a D-type flip-flop for a regenerator 107, the time slot for determining whether the data is a logic 0 or 1 is very small and hence less sensitive to noise.

The present switched capacitor coupled line receiver circuit 100 has an advantage over conventional transformer coupled circuits in that it transmits the DC component of the original signal appearing on leads T and R. Thus, there is no need to send bipolar signals to maintain a zero volt dc level. Consequently, by utilizing the present invention with full amplitude unipolar data signals a 6 db signal to noise advantage can be gained over using half amplitude bipolar data signal and a transformer coupled line receiver. Data frame detection is unaffected by the present invention.

The above paragraphs describe the operation of the present invention for digitized analog data or for digital data reception.

Figure 5:
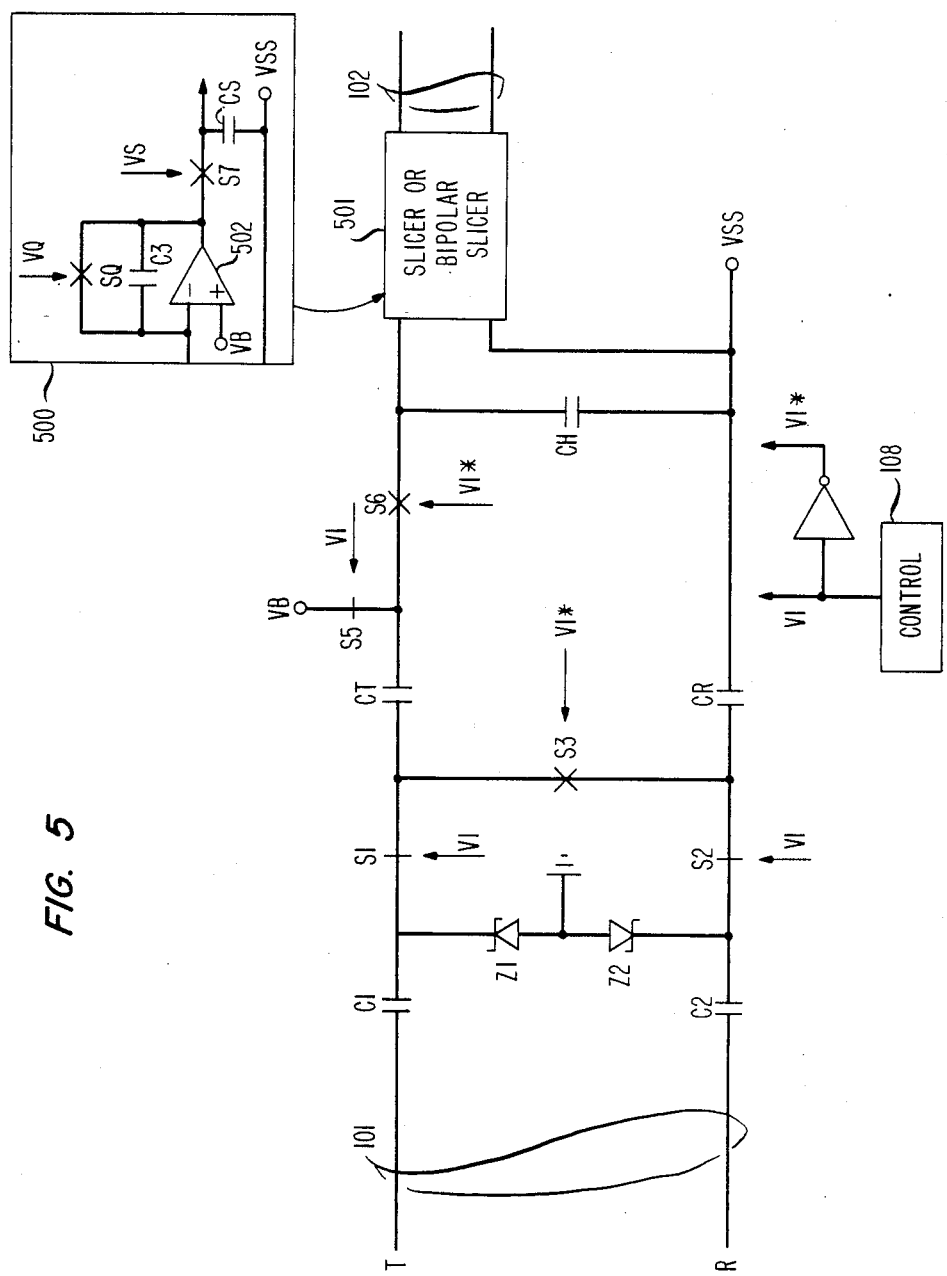
FIG. 5 illustrates a second embodiment of the present invention.

An illustrative embodiment of another form of the present invention is shown in FIG. 5. In this embodiment all of the switching is done on the network side, thereby eliminating the need for S4, CP, and inverter 112. Capacitors C1 and C2 become the isolation capacitors. CT and CH may now be a part of an integrated circuit. It is the usual practice in balanced line telephone transmission to connect the tip side of the line to a DC battery feed which is at ground. The ring side of the battery feed circuit is negative. Capacitors C1 and C2 permit shifting from the line voltages to a local network voltage which typically has VSS at ground and VDD at a positive potential.

The following discussion references FIGS. 1 and 5. Because DC voltage is not coupled by the receiver, capacitors C1 and C2 are added in from of switches S1 and S2. Zener diodes Z1 and Z2 pass the charge due to excessive voltage on leads T/R to ground thereby limiting the voltage range to a safe value. Switch S4 and capacitor CP of FIG. 1 are then eliminated. Digitally encoded analog or digital data signals have been assumed heretofore. The circuits of FIGS. 1 and 5 may also be used for analog signals. In an analog receiver, the size of CH is larger than capacitor CT and CR in series to provide some antialiasing filter action.

The circuit of FIG. 5 can also pass DC signal states through to Slicer of Bipolar Slicer 501 even though series capacitors C1 and C2 are present. When switches S1 and S2 are closed to connect capacitors CT and C1 in series and capacitors CR and C2 in series each set becomes a series capacitive divider. The transverse voltage across CT and C1 in series is, as before, $VB - (VTR/2)$. The voltage across CR and C2 in series is $(-VTR/2) - VSS$ as for FIG. 1. In a series capacitive divider, the voltage across each capacitor is inversely proportional to the size of the capacitors.

If capacitor $C1 = nCT = C2 = nCR$ then the voltage across CT is $V \times (n/(1+n))$. Where V is the total voltage across the divider pair, and n is the ratio C1/CT or C2/CR. As an example let $n=9$. Then $VCT = V \times (9/(1+9)) = 0.9$ V. $VC1 = V - 0.9$ V $= 0.1$ V. Thus, if $C1 = 9 \times CT = C2 = 9 \times CR$, 90 percent of the respective voltages will appear across C1 and C2 and 10 percent across CT and CR.

When in the sample position (S1, S2, S3 closed, S5 opened) each capacitive divider tracks any changes in VTR/2. If VTR remains fixed, as it would for a long "DC" state string of data bits, then capacitors CT and CR are each charged to the $n/(1+n)$ fraction, 90 percent in the example, of the voltage difference across the capacitive divider of which they are a part. When capacitors C2 and C1 are switched in series to the transfer position (S1, S2, S3 opened and S5 closed), the $n/(1+n)$ fractions of VTR/2 will add in series. Because the right terminal of CR remains connected to VSS, the right terminal of CT will drop by $n/(1+n) \times VTR$. This is only a gain reduction.

For the example, 90 percent of the T/R voltage is switched to decision circuit 501 by simultaneous closure of S6 in the transfer position. The charge stored across CT and CR in series is redistributed with the charge stored on capacitor CH. If capacitor CH is very small with respect to CT and CR, only a slight further reduction of the voltage at the input to circuit 501 will result if the present data state is different from the prior data state. Capacitor CH may be discharged between samples by a shorting switch (not shown) to remove any charge on CH due to the prior state if desired.

It is preferable to clock the decision device(s) of circuit 501 just before (or in the case of an edge triggered D-type flip-flop, when) the switches are returned to the sample state.

As in FIG. 1, any longitudinal voltages present appearing to the left of the Zener diodes Z1 and Z2 are limited to the range set by those Zener diodes. Capacitors CT and CR are also charged identically to the n/(1+n) fraction of any longitudinal voltages on T and R which fall within the Zener range. These cancel out in the same manner as illustrated in FIG. 4 for FIG. 1 when CR and CT are switched in series in the transfer position.

The circuits of either FIG. 1 or FIG. 5 can also be used to pickoff purely analog signals from the tip and ring circuit. In this case the signals appearing across capacitor CH are input to some analog buffer (shown as block 500) instead of Slicer or Bipolar Slicer 107 or 501. Conversion from an anlog signal to a sampled analog signal is required for applications in which the analog signal is digitally encoded prior to switching through the interline connection network.

In a sampled analog receiver, as is well known, it is desirable to provide an antialiasing filter to prevent unwanted out of band components from being aliased into the passband. By sampling the incoming signal at some rate K greater than the Nyquist rate (which latter is typically 8 KHz for speech) the switched capacitors can serve to perform a part or all of the antialiasing function.

Let Slicer or Bipolar Slicer 501 be replaced by an integrating operational amplifier 502 biased at voltage VB and having capacitor feedback. Capacitor CH is small compared to the other capacitors. Set the size of capacitor CT and CR such that their series equivalent when switched in the transfer mode is 1/K of the integrator feedback capacitor C3. Then each of the K times within a Nyquist interval that the capacitors are switched to the transfer position, 1/Kth charge stored on the series capacitors will be transferred to the integrator. The output of the integrating amplifier 502 is sampled, using switch S7 and capacitor CS, after K transfers are summed. Thus, signal VS occurs at 1/K the rate of signal V1. Then the feedback capacitor C3 is discharged by signal VQ and switch SQ just after the resample signal VS and just prior to summing another K samples in integrator 502. Hence, signal VQ which controls switch SQ occurs just after signal VS and just before the next V1 signal. This and other antialiasing filtering methods which may be used with the circuits of FIG. 1 and FIG. 5 are shown in my U. S. Pat. No. 3,934,097, issued on Jan. 20, 1976.

It is anticipated that many other well known circuits can be utilized to implement some or all of the circuitry and functions of the present invention. While the present receiver circuit invention is implemented using N or P type metal oxide semiconductor technology it is anticipated that other embodiments can be implemented using any of the well known discrete, hybrid or integrated circuit techniques. Additionally, the timing of various control pulses shown herein are illustrative and the timing can be changed to suit the particular application. Thus, what has been disclosed is merely illustrative of the present invention and other arrangements can be implemented by those skilled in the art without departing from the spirit and scope of the present invention. Although a balanced pair input line has been illustrated herein, the same principles apply to inputs with one lead fixed (at ground typically) such as coaxial cable.

What is claimed is:

1. A circuit for coupling signals received from a facility to communication apparatus, said circuit comprising
   a first capacitor,
   a second capacitor,
   first means for connecting a first terminal and a second terminal of said first capacitor, respectively, between a first lead of said facility and a first reference voltage during a first time interval and connecting said first and second terminals of said first capacitor, respectively, between a first terminal of said second capacitor and said first reference voltage during a second time interval,
   second means for connecting said first terminal and a second terminal of said second capacitor, respectively, between a second lead of said facility and a second reference voltage during said first time interval and connecting said first and second terminals of said second capacitor, respectively, in series between said first terminal of said first capacitor and a first input terminal of a voltage regenerator circuit during said second time interval, and
   said voltage regenerator circuit for coupling signals from said capacitors to said communication apparatus and having a second input terminal connected to said first reference voltage.

2. The receiver circuit of claim 1 further comprising a third capacitor connected across said first and second input terminals of said voltage regenerator circuit.

3. The receiver circuit of claim 1 wherein said first connecting means includes semiconductor switch devices operable in response to control voltages.

4. The receiver circuit of claim 1 further comprising means for limiting excessive voltages to said voltage regenerator circuit.

5. The receiver circuit of claim 1 further comprising means for generating said first time interval in response to detected voltage signal levels on said facility.

6. The receiver circuit of claim 5 wherein said generating means generates said second time interval, said second time interval being all time other than said first time interval.

7. The receiver circuit of claim 5 wherein said generating means includes means for coupling signals to said generating means during said second time interval.

8. The receiver circuit of claim 1 further comprising a fourth capacitor connected between said first terminal of said first capacitor and said first lead of said facility, and
   a fifth capacitor connected between said first terminal of said second capacitor and said second lead of said facility.

* * * * *